US012637239B2

(12) United States Patent
Mehta

(10) Patent No.: US 12,637,239 B2
(45) Date of Patent: May 26, 2026

(54) LANDING GEARS FOR AERIAL VEHICLE TO MINIMIZE AERODYNAMIC DRAG DURING FLIGHT

(71) Applicant: ideaForge Technology Limited, Navi Mumbai (IN)

(72) Inventor: Ankit Mehta, Navi Mumbai (IN)

(73) Assignee: ideaForge Technology Limited, Navi Mumbai (IN)

( * ) Notice: Subject to any disclaimer, the term of this patent is extended or adjusted under 35 U.S.C. 154(b) by 0 days.

(21) Appl. No.: 19/074,384

(22) Filed: Mar. 9, 2025

(65) Prior Publication Data

US 2025/0282505 A1 Sep. 11, 2025

(30) Foreign Application Priority Data

Mar. 11, 2024 (IN) .............................. 202421017458

(51) Int. Cl.
*B64U 60/40* (2023.01)
*B64U 10/20* (2023.01)
*B64U 30/299* (2023.01)

(52) U.S. Cl.
CPC ............. *B64U 60/40* (2023.01); *B64U 10/20* (2023.01); *B64U 30/299* (2023.01)

(58) Field of Classification Search
CPC ...... B64U 60/40; B64U 10/20; B64U 30/299; B64C 29/0025
See application file for complete search history.

(56) References Cited

U.S. PATENT DOCUMENTS

| | | | | |
|---|---|---|---|---|
| 2,292,392 A | * | 8/1942 | Miller ..................... | B64C 25/28 340/960 |
| 3,179,353 A | * | 4/1965 | Peterson ............. | B64C 29/0025 244/12.3 |
| 3,317,163 A | * | 5/1967 | Leclercq ................. | B64C 25/34 244/102 R |
| 3,335,960 A | * | 8/1967 | Alderson ............ | B64C 29/0091 60/230 |
| 3,700,189 A | * | 10/1972 | Timperman ........ | B64C 29/0025 244/12.4 |
| 3,912,201 A | * | 10/1975 | Bradbury ............ | B64C 29/0016 60/230 |

(Continued)

FOREIGN PATENT DOCUMENTS

| | | |
|---|---|---|
| CN | 111332465 | 6/2020 |
| EP | 3464061 | 4/2019 |
| EP | 3736213 | 11/2020 |

*Primary Examiner* — Medhat Badawi
(74) *Attorney, Agent, or Firm* — JMB Davis Ben-David

(57) ABSTRACT

An aerial vehicle (AV) 100 includes a rotor system 150 with a set of rotor arms 152 and a set of propellers 154 to provide a lift force during a vertical take-off of the AV 100; and a set of landing gears movably coupled to the rotor arms 152 for movement between a deployed position to support the aerial vehicle 100 during landing and take-off, and a retracted position to form an enclosure 210 around the set of propellers 154 to reduce aerodynamic drag during a forward movement of the AV 100 after the vertical take-off. The sets of landing gears can includes a pair of L-shaped landing gears 200, a C-shaped cross sectional landing gears, an another C-shaped cross sectional landing gears, a U-shaped slidable landing gears, and a flap-shaped slidable landing gears.

9 Claims, 6 Drawing Sheets

(56) References Cited

U.S. PATENT DOCUMENTS

| | | | | |
|---|---|---|---|---|
| 4,469,294 A * | 9/1984 | Clifton | B64C 39/12 | |
| | | | 244/12.3 | |
| 4,828,203 A * | 5/1989 | Clifton | B64C 29/0033 | |
| | | | 244/12.3 | |
| 5,769,317 A * | 6/1998 | Sokhey | F02K 3/025 | |
| | | | 239/265.23 | |
| 5,797,815 A * | 8/1998 | Goldman | A63H 33/18 | |
| | | | 473/588 | |
| 5,890,441 A * | 4/1999 | Swinson | B64U 10/13 | |
| | | | 244/12.3 | |
| 6,237,538 B1 * | 5/2001 | Tsengas | A01K 5/0114 | |
| | | | 119/710 | |
| 6,561,456 B1 * | 5/2003 | Devine | B64C 29/0025 | |
| | | | 244/12.3 | |
| 6,805,077 B2 * | 10/2004 | Goldman | A01K 15/025 | |
| | | | 119/707 | |
| 6,854,689 B1 * | 2/2005 | Lindahl | B64C 25/18 | |
| | | | 244/102 R | |
| 7,273,195 B1 * | 9/2007 | Golliher | A63H 27/12 | |
| | | | 244/17.11 | |
| 8,496,200 B2 * | 7/2013 | Yoeli | B64C 29/0025 | |
| | | | 244/23 B | |
| 9,108,477 B2 * | 8/2015 | Van Der Lelij | B64F 1/224 | |
| 9,145,207 B2 * | 9/2015 | Moschetta | B64C 25/36 | |
| 9,896,197 B2 * | 2/2018 | Vetter | B64C 27/26 | |
| 10,112,121 B2 * | 10/2018 | Tiefel | A63H 33/003 | |
| 10,137,983 B2 * | 11/2018 | Horn | B64U 10/20 | |
| 10,300,346 B2 * | 5/2019 | Hinnen, III | A63B 39/00 | |
| 10,696,372 B2 * | 6/2020 | Aldana | B64U 10/70 | |
| 11,102,544 B2 * | 8/2021 | Enke | H04N 23/54 | |
| 11,394,335 B1 * | 7/2022 | Szmuk | H02P 6/00 | |
| 11,485,488 B1 * | 11/2022 | Armer | B64C 29/0033 | |
| 11,584,512 B2 * | 2/2023 | Heafitz | G05D 1/0808 | |
| 11,661,179 B2 * | 5/2023 | Matsui | B64D 27/31 | |
| | | | 244/7 R | |
| 11,835,968 B1 * | 12/2023 | Szmuk | B64U 10/20 | |
| 11,975,821 B2 * | 5/2024 | Ishikawa | B64U 60/40 | |
| 12,043,421 B2 * | 7/2024 | Cevacins | B64U 70/99 | |
| 12,077,325 B2 * | 9/2024 | Chew | B64C 29/0025 | |
| 12,275,542 B2 * | 4/2025 | Heremans | B64U 50/14 | |
| 12,384,569 B2 * | 8/2025 | Zou | B64U 50/19 | |
| 2009/0084907 A1 * | 4/2009 | Yoeli | B64C 27/20 | |
| | | | 415/149.1 | |

| | | | | |
|---|---|---|---|---|
| 2014/0131507 A1 * | 5/2014 | Kalantari | B60F 5/02 | |
| | | | 244/2 | |
| 2016/0137293 A1 * | 5/2016 | Santangelo | B64C 25/32 | |
| | | | 244/50 | |
| 2016/0272317 A1 * | 9/2016 | Cho | G08G 1/162 | |
| 2016/0280359 A1 * | 9/2016 | Semke | B64U 60/60 | |
| 2017/0029101 A1 * | 2/2017 | Weissenberg | B64U 30/299 | |
| 2017/0036771 A1 * | 2/2017 | Woodman | B64C 25/54 | |
| 2017/0158322 A1 * | 6/2017 | Ragland | B64C 29/0025 | |
| 2017/0210468 A1 * | 7/2017 | Jacob | B64U 10/70 | |
| 2017/0291697 A1 * | 10/2017 | Kornatowski | B64U 30/293 | |
| 2018/0155018 A1 * | 6/2018 | Kovac | B64U 30/26 | |
| 2018/0178896 A1 * | 6/2018 | Lee | B64C 11/28 | |
| 2018/0304984 A1 * | 10/2018 | Zheng | H04N 7/185 | |
| 2018/0370625 A1 * | 12/2018 | Netzer | B64C 29/0033 | |
| 2019/0100296 A1 * | 4/2019 | Aldana López | B64U 10/70 | |
| 2019/0185155 A1 * | 6/2019 | DeLorean | B64D 27/34 | |
| 2019/0375492 A1 * | 12/2019 | Lee | B64C 11/46 | |
| 2019/0389573 A1 * | 12/2019 | Kahou | B64U 70/83 | |
| 2020/0010185 A1 * | 1/2020 | Bender | B64U 50/14 | |
| 2020/0180756 A1 * | 6/2020 | Kapeter | B64U 50/13 | |
| 2020/0354052 A1 * | 11/2020 | Chew | B64D 27/34 | |
| 2021/0129979 A1 * | 5/2021 | Wang | B64U 30/299 | |
| 2021/0300540 A1 * | 9/2021 | Robertson | B64C 39/10 | |
| 2021/0362836 A1 * | 11/2021 | Parks | B64C 29/0025 | |
| 2022/0204152 A1 * | 6/2022 | Campbell | B64U 10/20 | |
| 2022/0411047 A1 * | 12/2022 | Mihai | B64C 25/20 | |
| 2023/0037429 A1 * | 2/2023 | Sherman | H04B 5/79 | |
| 2023/0227184 A1 * | 7/2023 | Heremans | B64U 30/299 | |
| | | | 244/129.1 | |
| 2023/0257104 A1 * | 8/2023 | Chew | B64U 50/14 | |
| | | | 244/7 R | |
| 2023/0271700 A1 * | 8/2023 | Townsend | B64U 60/50 | |
| | | | 244/7 B | |
| 2023/0294852 A1 * | 9/2023 | Maeda | B64U 60/50 | |
| | | | 244/102 R | |
| 2023/0339594 A1 * | 10/2023 | Baxter | B64C 9/08 | |
| 2023/0382542 A1 * | 11/2023 | Sato | H02K 21/14 | |
| 2024/0002079 A1 * | 1/2024 | Zou | B64U 60/40 | |
| 2024/0076065 A1 * | 3/2024 | Torgersen | B64U 30/297 | |
| 2024/0199246 A1 * | 6/2024 | Shields | B64U 30/299 | |
| 2024/0286771 A1 * | 8/2024 | Lilleg-Staudenherz | | |
| | | | B08B 7/02 | |
| 2024/0294281 A1 * | 9/2024 | Akamatsu | B64U 10/13 | |
| 2024/0308701 A1 * | 9/2024 | Libert | B64U 20/00 | |
| 2025/0066015 A1 * | 2/2025 | Moore | F02K 1/15 | |
| 2025/0229921 A1 * | 7/2025 | Messick | B64U 10/20 | |
| 2025/0282505 A1 * | 9/2025 | Mehta | B64U 30/299 | |

* cited by examiner

500

504-2
152
504-1
502-1
502-2
502-N
506
154

152
502-1
502-2
154
508
502-N

LANDING GEARS FOR AERIAL VEHICLE TO MINIMIZE AERODYNAMIC DRAG DURING FLIGHT

CROSS-REFERENCE TO RELATED APPLICATION

Benefit is claimed to Indian Patent Application number 202421017458, filed Mar. 11, 2024, the contents of which are incorporated by reference herein in their entirety.

TECHNICAL FIELD

The present disclosure relates to the field of aerial vehicles. In particular, it pertains to an aerial vehicle. Specifically, the present disclosure pertains to different sets of landing gears of the aerial vehicle.

BACKGROUND

Background description includes information that may be useful in understanding the present invention. It is not an admission that any of the information provided herein is prior art or relevant to the presently claimed invention, or that any publication specifically or implicitly referenced is prior art.

Hybrid quadrotor technology offers an innovative and logistically simple solution to problem of vertical take-off and landing (VTOL) by combining the vertical take-off and landing capabilities of a quadrotor, and efficiency, speed, and range of a normal fixed-wing aircraft. Thus, a hybrid aerial vehicle (AV) can take-off and land vertically like helicopters, and transit to cruise flight like airplanes.

A Typical fixed-wing VTOL AV consists of rotor-blade arms along with fixed wings; and their integration in a single Aerial Vehicle. Besides offering performance advantage of working like a fixed-wing aircraft with vertical take-off and landing performance, they offer other advantages as well like no landing place restrictions, and that of long-range and high-speed characteristics. On account of the above advantages, these aerial vehicles are a versatile choice for a wide range of commercial and defence applications.

However, these aerial vehicles suffer from high aerodynamic drag when the mode is changed to fixed wing flight and its rotor propellers are not rotating. The presence of stationary propellers can lead to aerodynamic drag. In certain cases, the landing gears are also found to hinder camera view leading to a reduced situational awareness, impaired object detection and tracking. In addition, the landing gears too add to the aerodynamic drag, affecting range and endurance. There is, therefore, a requirement to address the abovementioned drawbacks and limitation of the hybrid VTOL aerial vehicles, so that their full potential could be realized.

A general object of the present disclosure is to provide an improved aerial vehicle that overcomes drawbacks of the conventional aerial vehicles.

An object of the present disclosure is to provide an aerial vehicle with reduced aerodynamic drag during flight.

An object of the present disclosure is to provide improved landing gears sets for aerial vehicles that reduce aerodynamic drag during flight.

Another object of the present disclosure is to provide improved landing gears for aerial vehicles that do not obstruct field of view (FOV) to the camera during flight.

Yet another object of the present disclosure is to provide improved landing gears for aerial vehicles that optimizes the aerodynamic profile of the drone to reduce aerodynamic drag during flight.

SUMMARY

Aspects of the present disclosure relate to the field of aerial vehicles (AV). In particular, the present disclosure relates to landing gears for aerial vehicles, such as hybrid vertical take-off and landing aerial vehicles, to reduce aerodynamic drag during flight after vertical take-off of the AV. Specifically, the present disclosure provides foldable landing gears that fold after the vertical take-off and take a position to reduce aerodynamic drag on account of rotors that are used for vertical take-off and landing.

In an aspect, the proposed aerial vehicle includes a rotor system to provide a lift force during a vertical take-off of the aerial vehicle and a set of landing gears. The rotor system includes a set of rotor arms and a set of propellers coupled to the rotor arms. The set of landing gears are movably coupled to the rotor arms for movement between a deployed position, in which the set of landing gears support the aerial vehicle during landing and take-off, and a retracted position, in which the set of landing gears form an enclosure around the set of propellers to reduce aerodynamic drag during a forward movement of the aerial vehicle after the vertical take-off of the aerial vehicle.

In an embodiment, each of the landing gears may include a pair of L-shaped support members, one on two opposite sides of the corresponding propeller. Each of the support members may have a vertical leg and a horizontal leg, with the horizontal leg of the two support members pivotally coupled to the corresponding rotor arm at a free end of the horizontal leg for movement between the deployed position and the retracted position such that, in the deployed position, a free end of the vertical leg of at least one of the two support members supports the UAV on ground. In the folded position the vertical legs of the two support members may be disposed horizontally under the corresponding propeller to create the enclosure around the propeller.

In an alternate embodiment of the landing gears, each of the landing gears may have a C-shaped cross section with an upper horizontal portion, a lower horizontal portion and a vertical portion, and the upper horizontal portion, at its free end, may be pivotally coupled to the corresponding rotor arm for movement between the deployed position and the retracted position. In the deployed position the lower horizontal portion supports the UAV on ground, and in the folded position the vertical portion is disposed horizontally under the corresponding propeller to create the enclosure around the propeller.

In another alternate embodiment of the landing gears, each of the landing gears may have a C-shaped cross section having a pair of vertical portions, and a horizontal portion connecting the two vertical portions. The vertical portions may be in sliding engagement with the corresponding rotor arm for movement between the deployed position, in which the horizontal portion moves down to support the UAV on ground, and the retracted position, in which the horizontal portion moves up to create the enclosure around the corresponding propeller along with the two vertical portions.

In yet another alternate embodiment of the landing gears, each of the landing gears may include a plurality of U-shaped slats coupled to the corresponding rotor arm at two free ends of the U-shaped slats. The plurality of U-shaped slats may be configured to be moved between the deployed position, in which the plurality of U-shaped slats shrink to move away from the corresponding propeller with a lower end of the U-shaped slats supporting the UAV on ground, and the retracted position, in which the plurality of slats extend to create the enclosure around the corresponding propeller.

In still another alternate embodiment of the landing gears, each of the landing gears may include a plurality of flaps connected together with at least one joining mechanism system and located under the corresponding rotor. The at least one joining mechanism may be configured to move the plurality of flaps between the deployed position, in which the plurality flaps are oriented vertically with gaps therebetween to allow airflow to pass there through and also support the UAV on ground, and the retracted position, in which the plurality of flaps are oriented horizontally without any gap therebetween to create the enclosure around the corresponding propeller.

In an embodiment, the aerial vehicle may include a first actuation mechanism to move the set of landing gears between the deployed position and the retracted position.

In an embodiment, the aerial vehicle may include a second actuation mechanism lock the set of propellers, before the corresponding landing gear is moved to the retracted, such that blades of the propeller are aligned with a flight direction to minimize a frontal area of the enclosure, thereby minimizing aerodynamic drag.

In an embodiment, the second actuation mechanism may be selected from a group comprising a mechanical actuator mechanism, an electronic actuator mechanism based on sensors, and a magnetic actuator mechanism.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Embodiments explained herein relate to the field of aerial vehicles (AV). In particular, the present disclosure relates to landing gears for aerial vehicles that reduce aerodynamic drag during flight, such for hybrid vertical take-off and landing aerial vehicles, where drag due to landing gears during flight is more pronounced, thereby making the AVs more promising.

It is to be appreciated that while the proposed concept of foldable landing gears is especially useful in case of hybrid VTOL aerial vehicles, the same can also be applied to conventional multi-copter aerial vehicles as well, such as to reduce drag due to one or more rotors that may be non-functional for operational reasons, to enhance efficiency of the aerial vehicle.

In one or more embodiments, the present disclosure provides different configurations of foldable landing gears that, in a deployed position, support the AV on ground, and in the folded/retracted position, when the AV is in flight and rotors used for vertical take-off have been turned off, such as in case of a hybrid VTOL aerial vehicle, make an enclosure around the corresponding rotors to reduce in-flight aerodynamic drag on the AV.

In an embodiment, by enclosing the rotor within a hollow enclosure during the flight, when the propeller is stationary, a more streamlined shape of the drone is created which guides the airflow around the stationary propellers in a controlled manner, reducing the resistance encountered during forward flight, thus reducing the aerodynamic drag caused by the exposed cross-sectional area of the stationary propellers.

In an embodiment, formed enclosure by the landing gear in retracted position is hollow such that the hollow enclosure is designed for controlled air flow.

It is to be appreciated that though, in different embodiments of the proposed landing gear, the landing gears have been identified by alphabetic letters, such as L-shaped, C-shaped and U-shaped, the alphabetic letters do not in any manner limit the shape of the respective landing gears in any manner whatsoever to the corresponding letter, and the landing gears can be of other shapes as well within the concept of their ability to move between a deployed position, in which they support the aerial vehicle, and a retracted position, in which they for an enclosure around the corresponding rotor/propeller.

Figure 1:
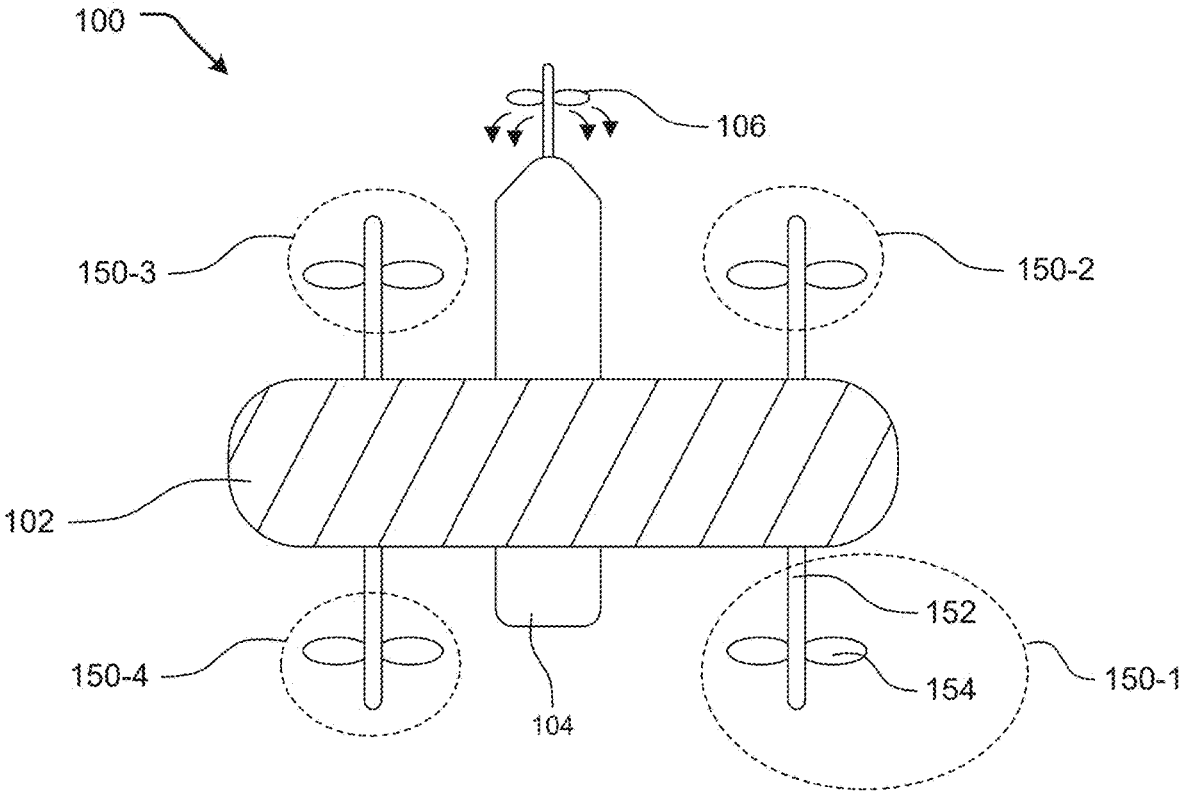
FIG. 1 illustrates a top view of a typical hybrid vertical take-off and landing aerial vehicle, showing major parts of the aerial vehicle.

FIG. 1 shows an exemplary top view of a typical aerial vehicle depicting various major parts of the AV. The aerial vehicle 100, which can be an unmanned aerial vehicle (UAV), provides the benefits of multi-rotor platforms to provide transition between the two modes of flight namely a vertical take-off/landing and a level flight.

The aerial vehicle 100 (also referred simply as AV or UAV, and these are used interchangeably, herein) includes a wing structure 102 configured cross-sectional to a fuselage 104. A rotor system such as 150-1, 150-2, 150-3 and 150-4 (collectively referred to as rotor system 150 herein) includes a set of rotor arms 152, and a set of top facing propellers 154 coupled to the rotor arm 152. The propellers 154 are conventional propellers sized according to the AV size, to meet the requirement of vertical take-off and landing. Also, the AV 100 includes one or more front facing propellers 106 for normal flight. The propellers 154 are functional during vertical take-off and landing and stop functioning and may get folded during flight. On the other hand, the front facing propeller 106 is non-functional during vertical take-off and run only during the flight. During the flight, the propellers 154 cause aerodynamic drag as airflow from front directly impinges their rotors and propellers, effecting efficiency of the AVs.

Furthermore, landing gears (not shown in FIG. 1) hinder camera view due to obstructions caused by the landing gears position, which reduces situational awareness, object detection and tracking. In an aspect, the present disclosure provides a simple, easy to install solution for the above problems, The present disclosure provides different configurations of landing gears, such as landing gears 200, 300, 400, 500, and 600, that conceal propeller system 154 during flight of the aerial vehicle 100 by forming, in a retracted position of the landing gears 200, 300, 400, 500, and 600, an enclosure around the propellers 154 to prevent frontal airflow from impinging the corresponding propellers 154.

Figure 2A:
FIG. 2A illustrates an exemplary front view of a L-shaped hingedly coupled set of landing gears in a deployed position, in accordance with an embodiment of the present disclosure.
Figure 2A:
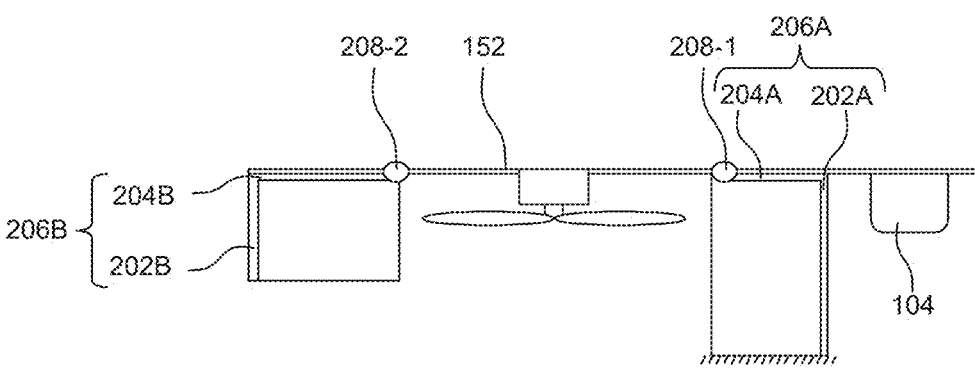
Figure 2B:
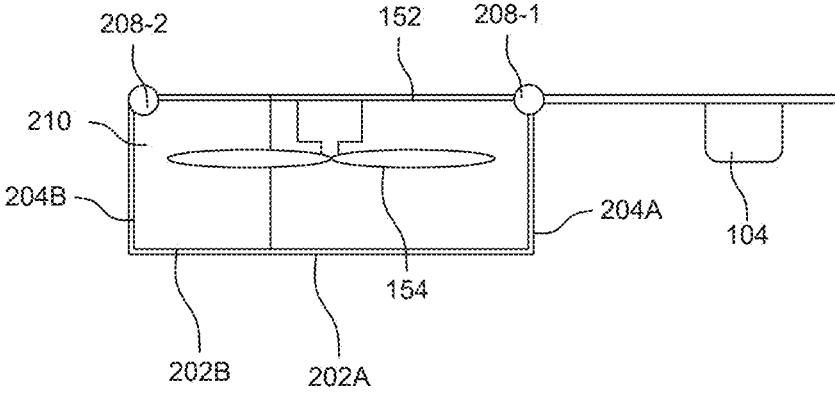
FIG. 2B illustrates an exemplary front view of the L-shaped hingedly coupled set of landing gears of FIG. 2A in a retracted position, in accordance with an embodiment of the present disclosure.

FIGS. 2A and 2B show exemplary front views of a first embodiment of the disclosed landing gear (also referred to as L-shaped hingedly coupled landing gear) in deployed position and retracted/folded position respectively.

In an embodiment, the landing gears 200 includes a pair of L-shaped support members, such as support members 206A and 206B (individually and collectively referred to as support member(s) 206, herein), one on two opposite sides of the corresponding propeller 154. Each of the support members 206 includes a vertical leg, such as vertical legs 202A and 202B (individually and collectively referred to as vertical leg(s) 202, herein) and a horizontal leg such as horizontal legs 204A and 204B (individually and collectively referred to as horizontal leg(s) 204, herein), with the horizontal leg 204 of the two support members 206 pivotally coupled at hinge joints, such as hinge joint 208-1 and 208-2 (collectively referred to as hinge joint 208, herein), to the corresponding rotor arm 152 at a free end of the horizontal leg 204 for movement between the deployed position and the retracted position, as shown in FIGS. 2A and 2B.

In an embodiment, as shown in FIG. 2A, in the deployed position, the free end of the vertical leg 202 of at least one of the two support members 206 supports the UAV on ground, and as shown in FIG. 2B, in the retracted position, the landing gear 200 forms a hollow cuboid structure around the corresponding propeller providing an enclosure.

Figure 3A:
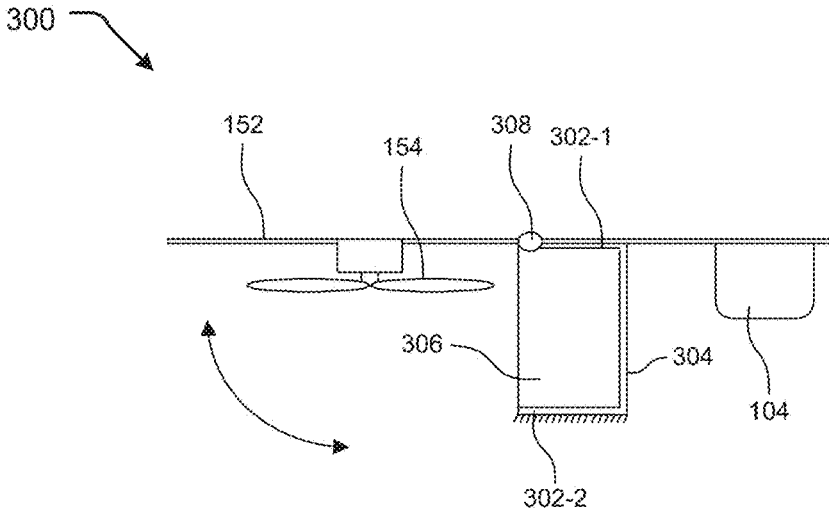
FIG. 3A illustrates an exemplary front view of the disclosed C-shaped hingedly coupled landing gears in a deployed position, in accordance with an embodiment of the present disclosure.
Figure 3B:
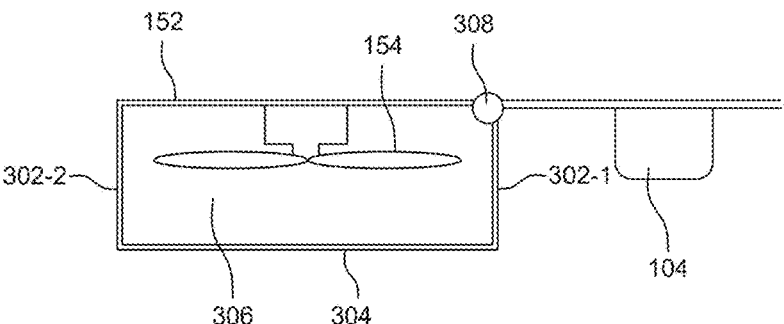
FIG. 3B illustrates an exemplary front view of the C-shaped hingedly coupled landing gears of FIG. 3A in a retracted position, in accordance with an embodiment of the present disclosure.

FIGS. 3A and 3B show exemplary front views of a second embodiment of the disclosed landing gear 300 (also referred to as C-shaped hingedly coupled landing gear) in deployed position and retracted/folded position respectively.

In an embodiment, each of the landing gears 300 includes a single member with a C-shaped cross section having an upper horizontal portion 302-1, a lower horizontal portion 302-2 and a vertical portion 304. The upper horizontal portion 302-1 is pivotally coupled, at a hinge point 308, to the corresponding rotor arm 152 at a free end of the upper horizontal portion 302-1 for movement between the deployed position and the retracted position.

In an embodiment, in the deployed position, the lower horizontal portion 302-2 supports the UAV on ground, as shown in FIG. 3A, and in the retracted position the landing gear 300 covers the corresponding rotor system 150, as shown in FIG. 3B. Specifically, in the retracted position, the vertical portion 304 gets reoriented horizontally under the corresponding propeller 154, as shown in FIG. 3B. This creates the enclosure 306 around the propeller 154 to reduce aerodynamic drag.

Figure 4A:
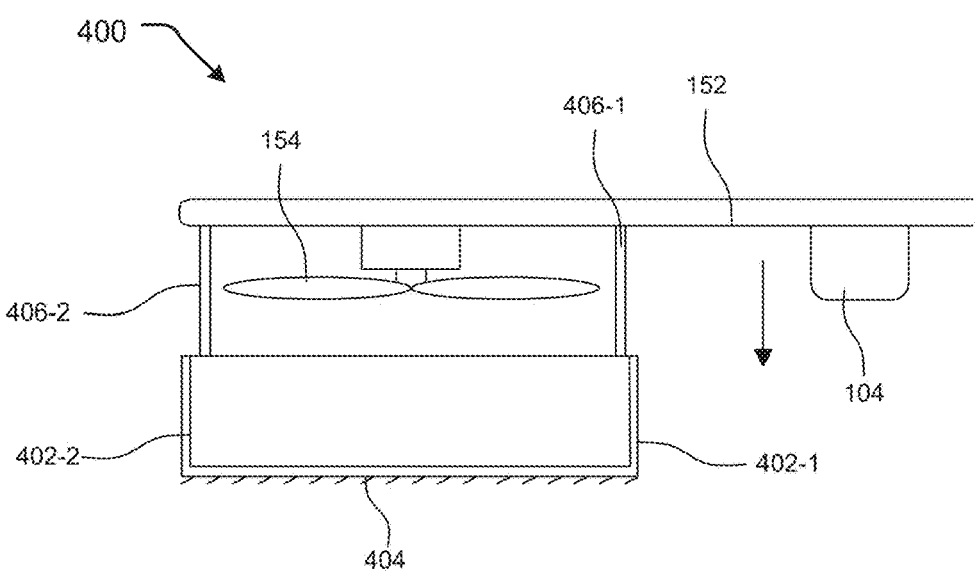
FIG. 4A illustrates an exemplary front view of a C-shaped vertically sliding type landing gears in a deployed position, in accordance with an embodiment of the present disclosure.
Figure 4B:
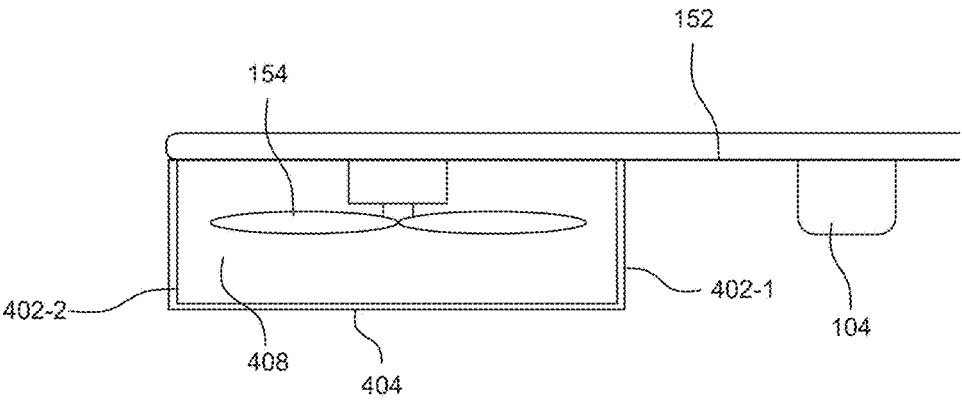
FIG. 4B illustrates an exemplary front view of the C-shaped vertically sliding type disclosed landing gears of FIG. 4A in a retracted position covering rotor system, in accordance with an embodiment of the present disclosure.

FIGS. 4A and 4B show exemplary front views of third embodiment of the disclosed landing gear 400 (Also referred to C-shaped vertically sliding type landing gears, herein) in deployed position and retracted position respectively.

In an embodiment, the landing gear 400 includes a C-shaped cross section having a pair of vertical portions 402-1 and 402-2, and a horizontal portion 404. The two vertical portions 402-1 and 402-2 are coupled in sliding engagement with a set of rails 406-1 and 406-2 fixed with the corresponding rotor arm 152 to facilitate up and down sliding movement for the landing gear 400. In the deployed position, the horizontal portion 404 moves down to support the UAV 100 on ground during landing, as shown in FIG. 4A. In the retracted position of the landing gear 400, as shown in FIG. 4B, the landing gear 400 conceals the corresponding propeller 154 by forming an enclosure around the rotor 150.

Figure 5A:
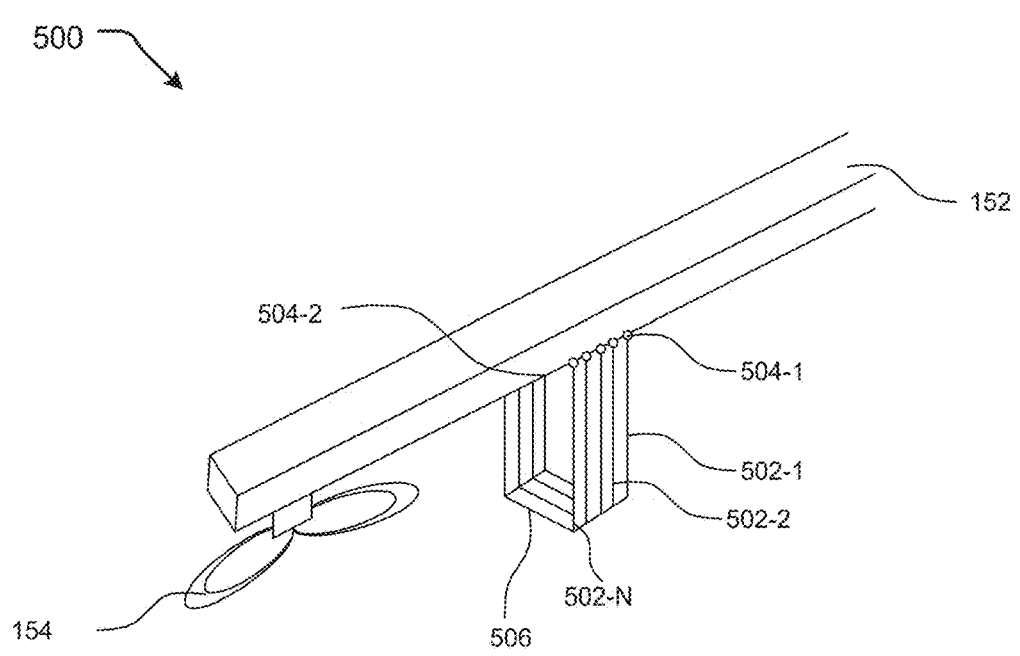
FIG. 5A illustrates an exemplary front view of an U-shaped horizontally sliding type fourth disclosed set of landing gears in a deployed position, in accordance with an embodiment of the present disclosure.
Figure 5B:
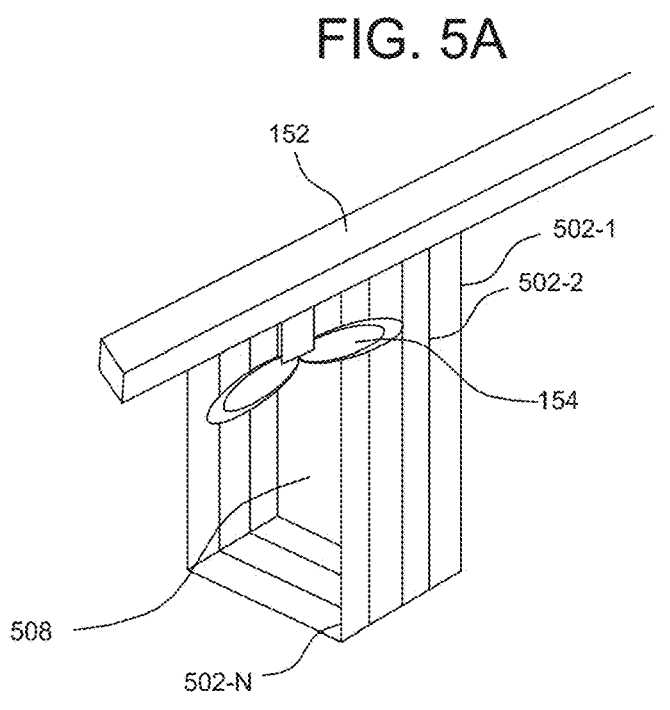
FIG. 5B illustrates an exemplary front view of the U-shaped horizontally sliding type set of landing gears of FIG. 5A in a retracted position covering rotor system, in accordance with an embodiment of the present disclosure.

FIGS. 5A and 5B show perspective views of a fourth embodiment of the disclosed landing gear 500 (also referred to as U-shaped horizontally sliding type, herein) in the deployed position and retracted position respectively. The landing gears 500 includes a plurality of U-shaped slats, such as slates 502-1, 502-1, . . . , 502-N (individually and collectively referred to as slat(s) 502, herein) coupled to the corresponding rotor arm 152 at two free ends, such as free ends 504-1 and 504-2, of the U-shaped slats 502.

In an embodiment, the landing gear 500 can be an origami bellow type retractable system. Specifically, the origami-inspired bellow shaped landing gear 500 can fold along predetermined fold lines, thereby forming a secure enclosure of variable shape and size, such that in the deployed position (as shown in FIG. 5B), when the landing gear is to support the aerial vehicle on ground, the size of the landing gear 500 is smaller, and when the landing gear 500 is retracted (as shown in FIG. 5A) during flight, the size of the landing gear 500 increases for covering the propeller 154. FIGS. 5A and 5B show a length difference of the landing gear 500 in the deployed and the retracted positions.

In an embodiment, in the retracted position, the plurality of U-shaped slats 502 are configured to move towards the corresponding propeller 154 to conceal the propeller 154 forming an enclosure, as shown in FIG. 4B, In the deployed position, shown in FIG. 5A, the slats 504 shrink and are moved away from the propeller 154, allowing the propeller to rotate and provide a lift force. In this position, lower ends 506 of all the U-shaped slats 502 collectively support the UAV 100 on ground, as shown in FIG. 5A.

In an embodiment, the landing gear 500 can be operatively coupled with a propeller alignment mechanism (also referred to as a second actuation mechanism, herein), such that when the landing gear 500 is retracted to cover the stationary propeller 154, the landing gear 500 aligns the direction of the propeller 154 along the forward direction of the UAV flight.

Figure 6A:
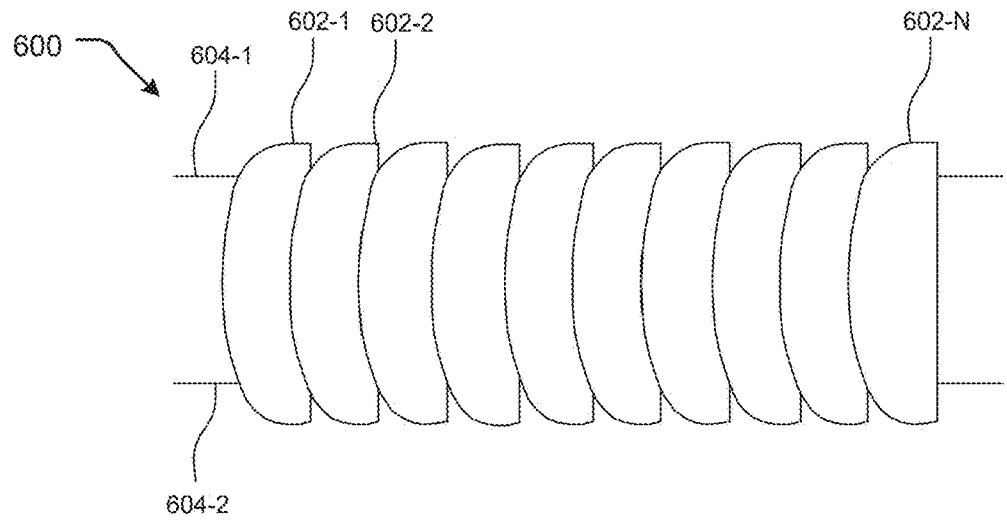
FIG. 6A illustrates an exemplary bottom view of a flap-based set of landing gears in a retracted position, in accordance with an embodiment of the present disclosure.
Figure 6B:
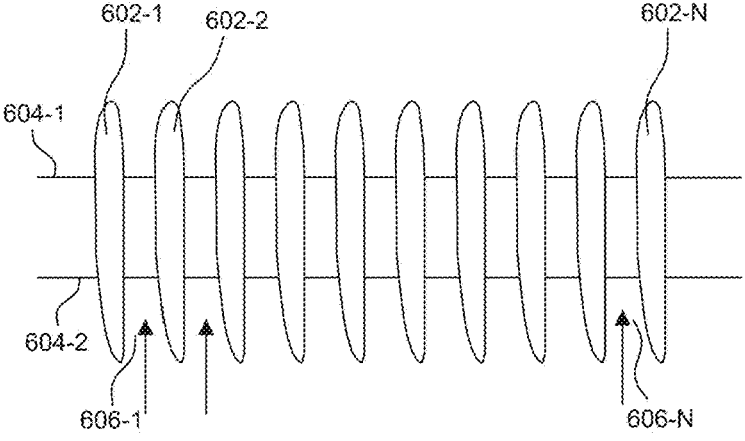
FIG. 6B illustrates an exemplary front view of the flap-based set of landing gears of FIG. 6A in a deployed position, in accordance with an embodiment of the present disclosure.

FIGS. 6A and 6B show exemplary bottom views of a fifth embodiment of the disclosed landing gear 600 (also referred to as flap-based horizontally sliding type landing gear, herein) in deplored position and the retracted position respectively.

In an embodiment, the landing gear 600 includes a plurality of flaps, such as flaps 602-1, 602-2, . . . , 602-N (individually and collectively referred to as flap(s) 602, herein) configured in a plane below the corresponding propeller and connected together by a joining mechanism, such as the joining mechanism 604-1 and 604-2 (collectively referred to as joining mechanism 604, herein). The joining mechanism 604 can move the plurality of flaps 602 between the retracted position, in which the flaps 602 are oriented horizontally eliminating gaps 606-1, 606-2, . . . , 606-N (refer FIG. 6A) therebetween to prevent airflow, as shown in FIG. 6B, and form an enclosure. In the deployed position, the flaps 602 are oriented vertically with gap 606 therebetween, which allows airflow from the corresponding propeller 152 to pass through for the propeller 154 to provide the lift force. In the vertical orientation, the flaps 604 can support the AV on ground at a lower edge of the flaps 602.

Figure 6C:
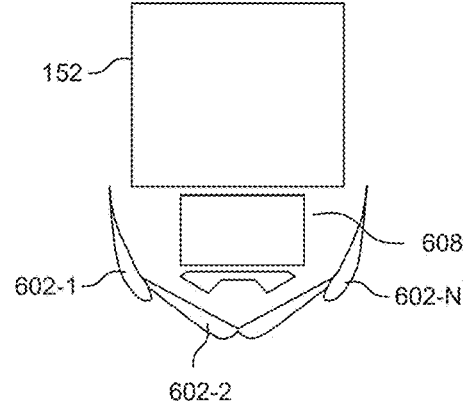
FIG. 6C illustrates an exemplary front view of the flap-based set of landing gears of FIG. 6A depicting a retracted position of the landing gear covering a rotor system, in accordance with an embodiment of the present disclosure.

FIG. 6C illustrates an exemplary front view of the UAV with flap-based landing gear 600 in retracted position covering the rotor 152, in which the plurality of flaps 602 are oriented to create the enclosure 608 around the corresponding propeller 154.

In an embodiment, the Aerial vehicle 100 with any of the landing gears 200, 300, 400, 500 and 600 may include a first actuation mechanism, such that the first actuation mechanism actuates the corresponding set of landing gears 200, 300, 400, 500 and 600 to the retracted position when the rotor stops to conceal the set of propellers 154 and form an enclosure.

In an embodiment, the Aerial vehicle 100 with any of the landing gears 200, 300, 400, 500 and 600 may include a second actuation mechanism which can automatically align the direction of the propellers 154 when the propellers 154 stops along a direction of the flight before the landing gear 200, 300, 400, 500 and 600 is moved to the retracted position such that area of the propeller 154 exposed to the frontal airflow is minimized. This can also help in reducing the size of the enclosure around the propellers 154, thereby offering least resistance to the frontal airflow and reducing the aerodynamic drag.

In an embodiment, the second actuation mechanism can be selected at least one from a mechanical actuator mechanism, an electronic actuator mechanism based on sensors, and a magnetic actuator mechanism where each blade of the propellers 154 can be fitted with magnets of same polarity or the reverse polarity and the designed set of landing gears can be fitted with magnets with opposite polarity. This repulsive or attracting property of magnets can align the propeller 204 in the desired direction within the enclosure formed by the landing gear 200, 300, 400, 500 and 600 locked until the rotors 154 are electrically rotated again.

In an embodiment, a front portion of the enclosure formed by the landing gears 200, 300, 400, 500 and 600 can include a shape that diverts the frontal airflow in a streamlined manner, away, either above or below or both, of the enclosure, Thus, the present disclosure provides a simple, easy installable solution to in the form of the landing gears 200, 300, 400, 500, and 600 to overcome drawbacks of the conventional aerial vehicles. Specifically, the landing gears 200, 300, 400, 500 and 600 can be moved, after the AV has vertically taken off, to a retracted position in which the landing gears 200, 300, 400, 500 and 600 form an enclosure around the propellers 154 to reduce aerodynamic drag, Reduced aerodynamic drag can make the aerial vehicles more efficient and increase their endurance.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

A general advantage of the present disclosure is to provide an improved aerial vehicle that overcomes drawbacks of the conventional aerial vehicles.

The present disclosure provides an aerial vehicle with reduced aerodynamic drag during flight.

The present disclosure provides improved landing gears for aerial vehicles that reduce aerodynamic drag during flight.

The present disclosure provides improved landing gears for aerial vehicles that do not obstruct field of view (FOV) to the camera during flight.

I claim:

1. A fixed wing vertical take-off and landing aerial vehicle (100), the aerial vehicle (100) comprising:
   a rotor system (150) comprising a set of rotor arms (152) and a set of propellers (154) coupled to the rotor arms (152); the set of propellers (154) configured to provide a lift force during a vertical take-off of the aerial vehicle (100); and
   a set of landing gears (200, 300, 400, 500, 600) movably coupled to the rotor arms (152) for movement between a deployed position, in which the set of landing gears (200, 300, 400, 500, 600) support the aerial vehicle (100) on ground after landing and before take-off, and a retracted position, in which the set of landing gears (200, 300, 400, 500, 600) form an enclosure (210, 306, 408, 508, 608) around the set of propellers (154) to reduce aerodynamic drag during a forward movement of the aerial vehicle (100) after the vertical take-off of the aerial vehicle (100).

2. The aerial vehicle as claimed in claim 1, wherein each of the landing gears (200) comprises a pair of L-shaped support member (206), one on two opposite sides of the corresponding propeller (154), each of the support members (206) comprising a vertical leg (202) and a horizontal leg (204); wherein the horizontal leg (204) of the two support members (206) is pivotally coupled (208) to the corresponding rotor arm (152) at a free end of the horizontal leg (204) for movement between the deployed position and the retracted position such that in the deployed position a free end of the vertical leg (202) of at least one of the two support members (206) supports the UAV on ground, and in the folded position the vertical legs (202) of the two support members (206) is disposed horizontally under the corresponding propeller (154) to create the enclosure (210) around the propeller (154).

3. The aerial vehicle as claimed in claim 1, wherein each of the landing gears (300) comprises a C-shaped cross section comprising an upper horizontal portion (302-1), a lower horizontal portion (302-2) and a vertical portion (304); wherein the upper horizontal portion (302-1) is pivotally coupled (308) to the corresponding rotor arm (152) at a free end of the upper horizontal portion (302-1) for movement between the deployed position and the retracted position such that in the deployed position the lower horizontal portion (302-2) supports the UAV on ground, and in the folded position the vertical portion (304) is disposed horizontally under the corresponding propeller (154) to create the enclosure (306) around the propeller (154).

4. The aerial vehicle as claimed in claim 1, wherein each of the landing gears (400) comprises a C-shaped cross section comprising a pair of vertical portions (402) and horizontal portion (404) connecting the two vertical portions; wherein the vertical portions are in sliding engagement (406) with the corresponding rotor arm (152) for movement between the deployed position, in which the horizontal portion (404) moves down to support the UAV on ground, and the retracted position, in which the horizontal portion moves up to create the enclosure (408) around the corresponding propeller along with the two vertical portions.

5. The aerial vehicle as claimed in claim 1, wherein each of the landing gears (500) comprises a plurality of U-shaped slats (502) coupled to the corresponding rotor arm (152) at two free ends (504) of the U-shaped slats (502); wherein the plurality of U-shaped slats (502) are configured to move between the deployed position, in which the plurality of U-shaped slats (502) shrink to move away from the corresponding propeller (154) and a lower end (506) of the U-shaped slats (502) supporting the UAV (100) on ground, and the retracted position, in which the plurality of slats (502) extend to create the enclosure (508) around the corresponding propeller (154).

6. The aerial vehicle as claimed in claim 1, wherein each of the landing gears (600) comprises a plurality of flaps (602) connected together with at least one joining mechanism (604) and located under the corresponding rotor (152); wherein the at least one joining mechanism (604) is configured to move the plurality of flaps (602) between the deployed position, in which the plurality flaps (602) are oriented vertically with gaps (606) there between to allow airflow to pass therethrough and also support the UAV on ground, and the retracted position, in which the plurality of flaps (602) are oriented horizontally without any gap there between to create the enclosure (608) around the corresponding propeller (154).

7. The aerial vehicle as claimed in claim 1, wherein the aerial vehicle comprises a first actuation mechanism to move the set of landing gears (200, 300, 400, 500, 600) between the deployed position and the retracted position.

8. The aerial vehicle as claimed in claim 1, wherein the aerial vehicle comprises a second actuation mechanism to lock the set of propellers (152), before the corresponding landing gear (200, 300, 400, 500, 600) is moved to the retracted position, such that blades of the propeller (152) are aligned with a flight direction to minimize a frontal area of the enclosure (210, 306, 408, 508, 608), thereby minimizing aerodynamic drag.

9. The aerial vehicle as claimed in claim 8, wherein the second actuation mechanism is selected from a group comprising a mechanical actuator mechanism, an electronic actuator mechanism based on sensors, and a magnetic actuator mechanism.

\* \* \* \* \*